United States Patent [19]

Davis

[11] 4,301,006
[45] Nov. 17, 1981

[54] SHIP-BORNE OIL DISPERSANT PROCEDURE AND APPARATUS

[76] Inventor: Murray A. Davis, 2443 Brookhurst Rd., Mississauga, Ontario, Canada, L5J 1R4

[21] Appl. No.: 45,333

[22] Filed: Jun. 4, 1979

[51] Int. Cl.³ .............................................. B01D 21/24
[52] U.S. Cl. .................................. 210/96.1; 210/104; 210/925; 114/74 R; 114/183 R; 114/256; 73/49.2; 340/605; 169/45
[58] Field of Search ................ 405/60; 222/52; 44/7; 220/88 B, 88 R, 85 S; 73/49.2, 61 R, 61.1 R; 210/85, 87, 90, 96 R, 96.1, 97, 103, 104, 105, 242 R, 242 AS, 96.1, 625; 114/67 R, 67 A, 227, 74 R, 74 A, 74 T, 183 R, 256, 257, 264–267; 9/8 P; 169/62, 45; 340/605; 244/129.2

[56] References Cited

U.S. PATENT DOCUMENTS

| | | | |
|---|---|---|---|
| 3,285,718 | 11/1966 | Whitfield | 44/7 |
| 3,561,601 | 2/1971 | McNeely | 210/242 |
| 3,777,821 | 12/1973 | Cude | 169/45 |
| 3,841,146 | 10/1974 | Cross | 73/49.2 |
| 3,859,845 | 1/1975 | Sawyer | 73/49.2 |
| 3,974,940 | 8/1976 | Bartik | 222/52 |
| 4,088,193 | 5/1978 | Colgate | 220/88 B |

Primary Examiner—Trygve M. Blix
Assistant Examiner—D. W. Keen
Attorney, Agent, or Firm—Cushman, Darby & Cushman

[57] ABSTRACT

A method and system for dispersing oil in the event of an oil leak into a body of water from an oil tanker or an oil drilling platform. There is provided structure for detecting the existence of a leak from a container of oil generally surrounded by a body of water into which the oil is leaking; structure for storing an oil dispersant at the site of the leak; and structure responsive to the occurrence of the leak, for automatically causing the dispersant to be released from the containment structure into the leaking oil. In an oil tanker, the system and method may be implemented by providing structure for detecting a leak in the oil tank wall, suspending a container of dispersant inside the oil tank, and providing structure for rupturing the dispersant container in response to the detection of a leak so that dispersant is caused to mix with the oil in the tank before the oil leaks therefrom. In the case of an offshore oil drilling platform, the system and method may be implemented by leak detection devices mounted to the drill casings or on buoys in the water body, one or more dispersant containers with release chutes directed toward the water body mounted to the side of the platform, and structure responsive to the detection devices for opening the dispersant containers in response to the detection of an oil leak.

14 Claims, 5 Drawing Figures

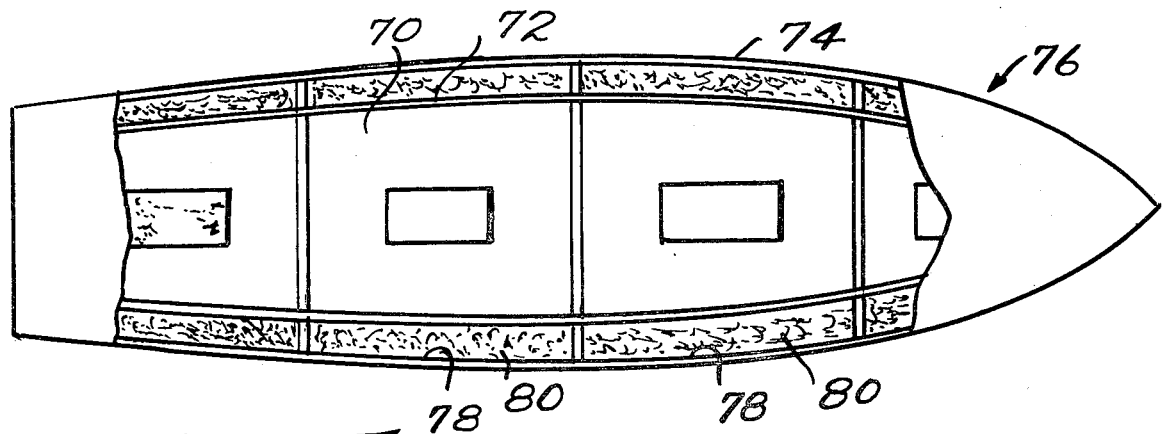
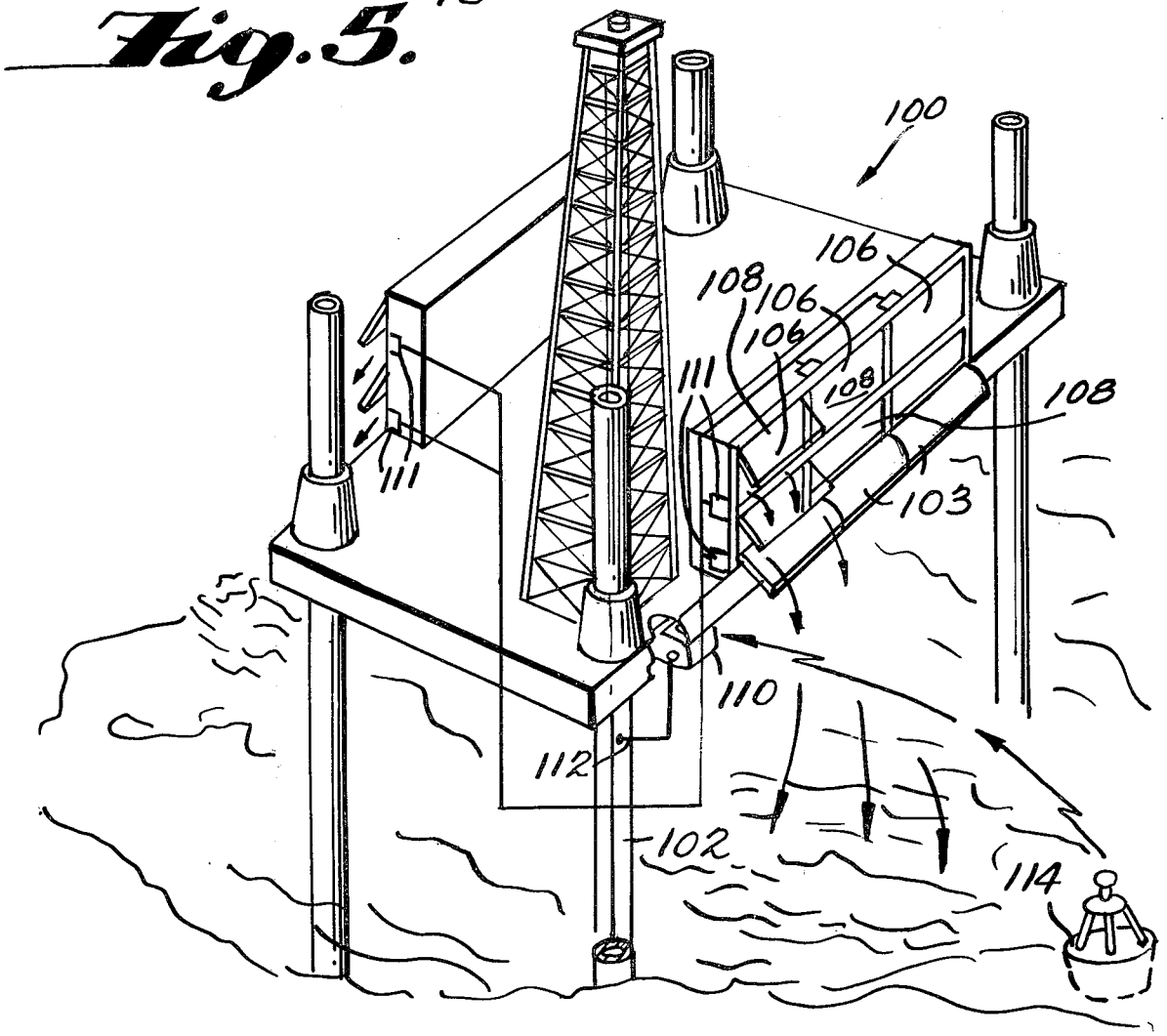

SHIP-BORNE OIL DISPERSANT PROCEDURE AND APPARATUS

FIELD OF THE INVENTION

The present invention relates to oil dispersants, and more particularly, to a system and a method for automatically releasing dispersants into oil when an oil leak is detected at an off-shore drilling platform or in an oil tanker.

BACKGROUND OF THE INVENTION

The use of oil dispersants for cleaning up after oil spills in rivers, harbors and at sea is well known. The dispersants cause the oil to break up and disperse throughout the water rather than form a coating on top of the water which can result in numerous well known adverse effects to the environment. Examples of oil dispersants are "Corexit 8666" produced by Esso Chemicals of Canada, "BP 1100X" produced by BP Canada, Ltd., and "Oilsperse 43" produced by Diachem Industries, Ltd. Ordinarily, the dispersant is added to the oil only after a person has detected a leak and substantial amounts of oil have already flowed into the water and spread over a wide area. However, particularly on rivers and where the waters are rough, the escaping oil can spread extremely rapidly and much of it may not be dispersed or cleaned up before serious damage has resulted to shore areas and flora and fauna beneath the water's surface. The farther the oil has spread across the surface of the water, the more difficult, time consuming and expensive the chore of dispersing or cleaning up the oil. Therefore, in order to prevent the leaking oil from spreading over a wide area, very quick remedial action is required. Often human recognition of and action in response to a serious oil leak are not fast enough to prevent these results from occuring. Accordingly, it is a principal object of the present invention to provide a method and a system for automatically treating oil with an oil dispersant before or immediately after its release through a leak to an outside body of water.

SUMMARY OF THE INVENTION

In accordance with the method and system of the present invention, there is provided: a means for detecting the existence of a leak from a container of oil generally surrounded by a body of water into which the oil is leaking; means for storing an oil dispersant at the site of the leak, and means, responsive to the occurrence of the leak, for automatically causing the dispersant to be released from the containment means into the leaking oil. In an oil tanker, the system and method of the invention may be implemented by providing means for detecting a leak in the oil tank wall, suspending a container of dispersant inside the oil tank, and providing means for rupturing the dispersant container in response to the detection of a leak. In this way, dispersant is caused to mix with the oil in the tank before the oil leaks therefrom. In accordance with one embodiment of the invention, dry dispersant is disposed in the space between the oil tank and the outer hull of the ship, or between inner and outer tank walls in the case of a double walled tank, so that dispersant will mix with the oil as it flows through the leak, thereby increasing the mixing of dispersant with the escaping oil.

In the case of an off-shore drilling platform, the system and method of the invention may be implemented by leak detection devices mounted to the drill casing, or casings, one or more dispersant containers, which may be similar to an ore or grain-type storage bin, with release chutes directed to the water body mounted to the side of the platform, and means responsive to the detection devices for opening the dispersant containers in response to the detection of an oil leak, e.g., a blow out. Detection of a leak could, for example, be transmitted electronically to an electronic actuable door opening mechanisms respectively mounted on the storage bins. The leak detection devices could alternatively or additionally be mounted to buoys or the oil platform and detect oil on the water's surface by optical or chemical means. In the event of a leak, the bin would be caused to open, dumping dipersant via the chute into the body of water whose natural current flow would lead to dispersant to the oil which has escaped. Upon reaching the escaped oil, the dispersant mixes with the oil to cause the oil to disperse.

BRIEF DESCRIPTION OF THE DRAWINGS

FIG. 4 is a schematic plan view of an oil tanker in accordance with a third embodiment of the invention; and FIG. 5 illustrates a fourth embodiment of the invention adapted for use at an off-shore drilling platform.

DESCRIPTION OF THE PREFERRED EMBODIMENT

Figure 1:
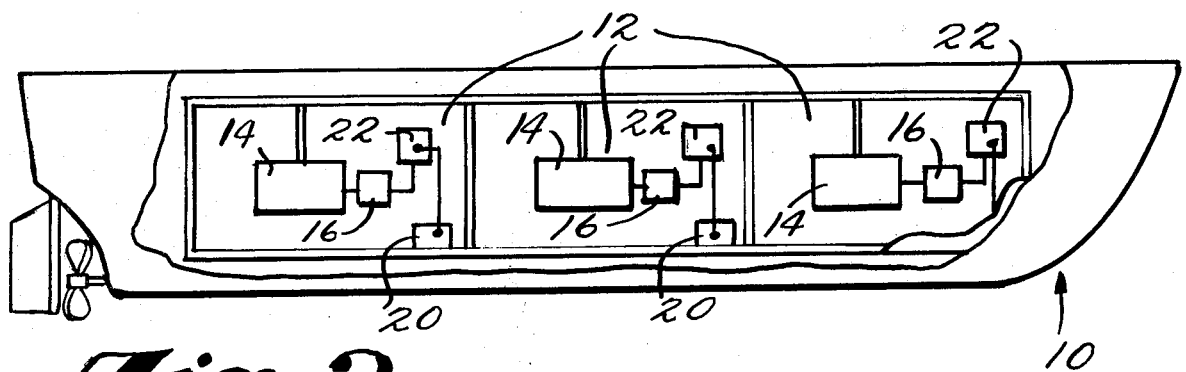
FIG. 1 is a schematic diagram of the invention shown in an oil tanker.

Referring first to FIG. 1, there is shown a very general schematic diagram representing those embodiments of the invention which may be incorporated into an oil tanker. Tanker 10 has a number of tank compartments 12, each of which has disposed therein one more more containers 14 rigidly mounted to the interior walls of tank compartments 12. Each container 14 is filled with an oil dispersant, such as "Oilsperse 43" produced by Diachem Industries, Inc. Container 14 may be placed within the tank compartment 12 surrounded by oil as is shown in FIG. 1 so that upon rupture of the container the dispersant will mix with the oil. Alternatively, vessel 14 may be disposed outside the tank compartment with pipes suitable for delivering the dispersant leading into the compartment 12. Rupture means 16 for rupturing the container 14 are operatively connected thereto. A leak detector 20 is also disposed in each tank in order to detect leaks of oil from the tank compartment 12 to outside of the tanker. When an oil leak occurs, the leak detector transmits a signal to a rupture actuator 22 which is operatively connected to rupture means 16. Rupture actuator 22 in turn actuates rupture means 16 to rupture dispersant container 14.

Figure 2:
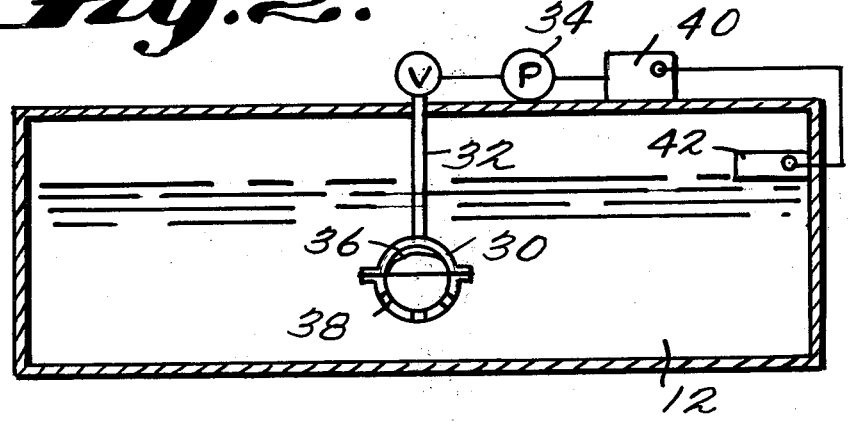
FIG. 2 is a partly schematic illustration of a first embodiment of the present invention.

Referring now to FIG. 2, there is schematically illustrated one embodiment of the oil disperser generally represented in FIG. 1. In accordance with this embodiment, a container 30, supported interiorly of oil tank compartment 12 is connected by a pressure line 32 to a pressure source 34. Vessel 30 is provided with an internal diaphragm 36. A plurality of ports, such as port 38 are located on the side of diaphragm 36 opposite the connection of the line 32. Each port 38 is provided with frangible closure means so that upon application of pressure on line 32, the closure means will rupture, whereupon actuation of the diaphragm 36 will eject oil dispersants stored in container 30 into the oil stored in tank compartment 12. Alternatively, container 30 may itself be frangible so that the entire vessel will rupture upon application of internal pressure from pressure line 32. Similar containers are disclosed in U.S. Pat. No. 3,285,718, the disclosure of which is hereby incorporated by reference herein. Pressure source 34 is electrically actuated to cause container 30 or its ports 38 to burst as by actuator 40, as will be described, when a leak in tank compartment 12 is detected by a leak detector. The leak detector is suitably oil level gauge 42, a conventional oil level gauge as would normally be located in the most of today's oil tankers. Electrical actuation device 40, responsive to decreases in the oil level measured by gauge 42 is connected to pressure source 34 and actuates the pressure source when a decrease in the measured oil level of a predetermined magnitude is detected. In order to obtain oil level measurments which are independent of the turbulence of the oil in the tank compartments caused by the pitching and rolling of the ship, actuation device 44 may be made responsive to a time average of the level gauge measurement. Alternatively, actuation device 40 may include suitable averaging circuitry for averaging the oil level measurements of a series of oil level gauges 42 disposed at various locations in the tank compartment.

Other suitable leak detection devices may also be utilized. For example, pressure sensors may be disposed at various locations within the tank compartment in order to detect changes in oil pressure which would accompany a leak; or devices which would detect in any manner a change in volume of the oil in the tank compartment. Another example of a leak detector would be a tank wall deformation detector which could, for example, include an electrified wire grid surrounding the lower and side oil tank compartment which upon breakage or deformation cause a leak detector signal to be generated; or the system as disclosed in U.S. Pat. No. 3,789,791 (the disclosure of which is hereby incorporated by reference herein) could be utilized, with oil dispersant disposed in all tubes.

Figure 3:
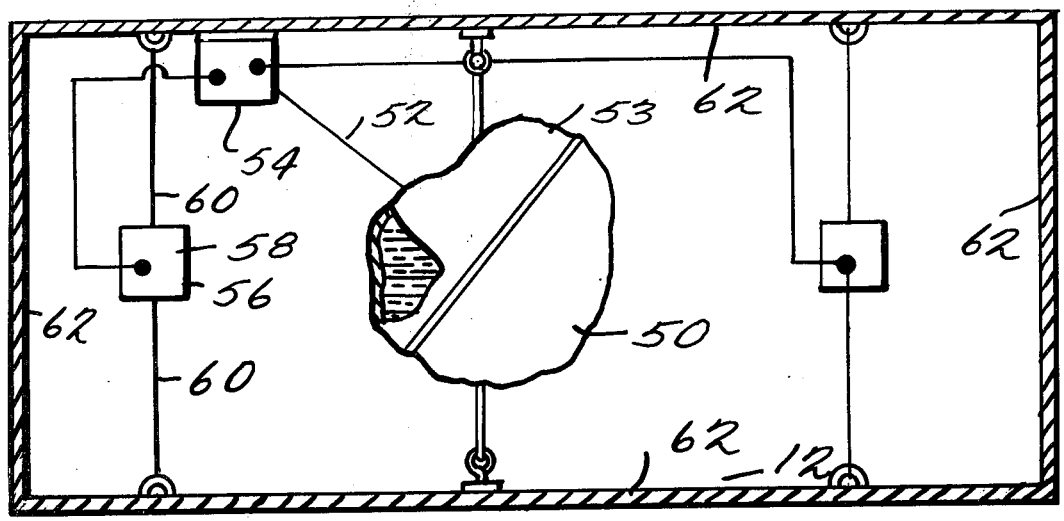
FIG. 3 is a schematic diagram of a second embodiment of the invention in an oil tanker.

Turning now to FIG. 3, a second preferred embodiment of the invention is schematically illustrated, wherein a flexible container 50 is supported interiorly of the tank compartment 12 and surrounded by oil therein. Container 50 contains oil dispersant which is released to the surrounding oil when the container is ruptured. A cable 52 fixed to the walls 53 of container 50 is connected to an automatic cable pulling mechanism 54. Container 50 has one or more seams which assure that the container will rupture when cable pulling mechanism 54 pulls on cable 52. Cable pulling mechanism 54 may be actuated by an output signal from a suitable leak detector such as wall deformation detector 56. Wall deformation detector 56 typically includes a number of tension detectors 58 each connected at opposite ends to two points along the tank compartment walls by pairs of tensioned wires 60, and are capable of producing output signals upon the occurrence of a change of predetermined magnitude in the tension in any pair of wires 60. The outputs of tension detectors 58 are connected to automatic cable pulling mechanism 54.

Upon the occurrence of a deformation of sufficient magnitude in the tank compartment walls 62 to indicate a leak, a change in the tension above the predetermined magnitude in at least one pair of wires 60 will be sensed by a detector 58. The output signal of detector 58 is transmitted to pulling mechanism 54 which is thereby actuated to pull cable 52 and rupture container 50 to release dispersant into the oil in tank compartment 12.

In accordance with another feature of the present invention, a dry oil dispersant is placed between the hull of the ship and the outer walls of the oil tank so that in the event of a rupture of the tank, the escaping oil will mix the dispersant. This feature serves essentially as a "holding action" until the dispersant container has been ruptured and the dispersant therein has completely mixed with the oil which surrounds it. This feature is illustrated in FIG. 4 which shows three oil tank compartments 70 whose bottom and outer side walls 72 are surrounded in spaced relation by the hull 74 of tanker 76. Compartmentalized spaces 78 between walls 72 and hull 74 are filled with a dry oil dispersant 80 of suitable composition so that it will mix with and dispense oil with which it contacts in the event of a rupture in the tank outer walls 72. If double walled oil tanks are utilized, the dispersant may be inserted between these walls instead of the space between the hull and the outer walls.

FIG. 5 schematically illustrates a further embodiment of the invention particularly applicable for automatically releasing dispersant at the time of a blowout at an off-shore oil drilling platform. An off-shore oil drilling platform 100 having a drill casing 102 has mounted about the periphery thereof a series of compartmentalized coal or grain-type storage bins 104 which contain a quantity of oil dispersant. Each bin has a release chute 103 which directs the dispersant into the water adjacent to the platform. Detachable oil dispersant containers could also be used, and would be particularly advantageous at temporary, exploratory off-shore wells and in other circumstances where it is desirable to be able to move the containers to alternate locations. Side-by-side bin compartments 106 each have doors 108 which may be individually opened in response to electrical signals from an actuator 110 mounted to platform 100 through suitable electric door opening devices 111 mounted to each bin adjacent each door 108. Actuator 110 is responsive to an electrical signal from a leak detector as will be described.

Mounted to the drill casing 102 is a leak detector 112 which is capable of detecting oil leaks from drill casing 102 as, for example, by detecting a pressure variation therein. Leak detectors 112 may be of any suitable conventional construction which generates an electrical signal indicative of an oil leak. Alternatively or as an optional addition to leak detector 112, one or more conventional floating oil leak detectors 114 such as the leak detector described in U.S. Pat. No. 3,603,952, the disclosure of which is hereby incorporated by reference herein, may be utilized to telemeter or transmit by hard wire appropriate signals to actuator 110 in the event of an oil leak. In order that the water surrounding the platform is not immediately saturated by oil dispersant in response to the detection of a leak, leak detectors 112 and 114 and actuator 110 should include appropriate conventional circuitry to assure that bin compartments doors 108 are opened by door opening devices 111 in a time sequence in response to continuous oil detection. The storage bins 104 would ordinarily be mounted to the platform 100 at locations which are separated from the drill casing since oil leaks on oil drilling platforms are sometimes accompanied by fires. The ocean currents will automatically direct the dispersant flow toward the oil which has escaped at the time of a blowout.

Another alternative to the use of electric signal generating leak dectectors mounted to the drill casing would be a mechanical link between the drill casing 102 and the storage bins 104 which would be actuated by the actual force of a blowout.

It will be understood that various changes in the details, arrangements of parts and operating conditions which have been herein described and illustrated in order to explain the nature of the preferred embodiments of this invention may be made by those skilled in the art within the principle thereof without departing from the scope of this invention as defined by the following claims. For example, a number of conventional mechanical, pneumatic, hydraulic and electronic and other means for detecting an oil leak, and a number of conventional mechanical, pneumatic, hydraulic, electronic and other means for causing a quantity of oil dispersant to be released into oil in an oil tank into the water at an off-shore oil drilling facility, may be utilized to carry out the invention whose scope is limited only by the claims.

What is claimed is:

1. An oil disperser system comprising:
   (a) means for automatically detecting a leak of oil from a first container into a body of water;
   (b) means for holding an oil dispersant; and
   (c) means, responsive to said detecting means, for automatically releasing said oil dispersant from said dispersant holding means into said oil so that said oil is dispersed in said body of water;
   said first container comprising an oil tank in a ship, said ship supporting said holding means and said detecting means, and said holding means being disposed inside said oil tank, said holding means being surrounded by oil when said tank is filled with oil;
   said releasing means comprising means for causing a rupture in said holding means such that said dispersant is passed through said rupture into said oil; and
   said holding means comprises at least one dispersant holding tank, said holding tank having a frangible closure means, rupturable upon application of internal pressure, for releasing said dispersant from said at least one holding tank and pressure time means responsive to said leak detecting means and communicating with the interior of said at least one tank, for pressurizing said tank to rupture said frangible closure means.

2. An oil disperser system as in claim 1 wherein said detecting means comprises means for detecting a deformation of the walls of said tank indicative of said leak.

3. An oil disperser system comprising:
   (a) means for automatically detecting a leak of oil from an oil tank in a ship into a body of water;
   (b) means for holding an oil dispersant; and
   (c) means, responsive to said detecting means, for automatically releasing said oil dispersant from said dispersant holding means into said oil so that said oil is dispersed in said body of water;
   said ship supporting said holding means and said detecting means; and
   said detecting means comprising means for detecting a deformation of the walls of said tank indicative of said leak.

4. An oil disperser system as in claim 3 wherein said detecting means comprises means for detecting a change in the level of said oil in said tank indicative of said leak.

5. An oil disperser system as in claim 3 wherein said deformation detecting means includes an electric circuit fixed along the inside wall of said tank such that said electric circuit will be broken by deformation of said inside walls and means for detecting an open circuit in said electric circuit.

6. An oil disperser system as in claim 3 wherein said deformation detecting means includes inelastic flexible elements interconnected between said tank walls and said dispersant container such that deformation of said walls exerts a force which is transmitted through said elements to said dispersant container to cause said dispersant container to rupture, releasing said dispersant into said oil.

7. An oil disperser system comprising:
   means for automatically detecting an oil flow at an off-shore drilling platform, into a body of water;
   means for holding an oil dispersant, said platform supporting said holding means; and
   means, responsive to said detecting means, for automatically releasing said oil dispersant from said dispersant holding means into said oil so that said oil is dispersed in said body of water; and
   wherein said holding means includes a second container having a plurality of sections, said releasing means including means for releasing said dispersant from each of said sections in a predetermined sequence.

8. A method for dispersing oil with an oil dispersant in the event of a leak of said oil from a first container having exterior walls adjacent to a body of water, said method comprising the steps of:
   storing said dispersant in a second container adjacent said oil;
   automatically sensing a condition caused by said leak including sensing a change in oil pressure inside the first container, and sensing a change in the volume of oil in the first container; and
   automatically releasing said dispersant from said second container into said oil in response to said sensing so that said oil may be dispersed thereby.

9. A method for dispersing oil with an oil dispersant in the event of a leak of said oil from a first container having exterior walls adjacent to a body of water, said method comprising the steps of:
   storing said dispersant in a second container adjacent said oil;
   automatically sensing a condition caused by said leak including the step of sensing a deformation in the walls of the first container; and
   automatically releasing said dispersant from said second container into said oil in response to said sensing so that said oil may be dispersed thereby.

10. A method for dispersing oil as in claim 9 wherein said step of sensing a deformation includes the step of open circuiting an electrical current adjacent said deformation.

11. A method for dispersing oil with an oil dispersant in the event of a leak of said oil from a first container in a ship, said method comprising the steps of:
   storing said dispersant in a second container adjacent said oil, said second container being mounted inside said first container;

automatically sensing a condition caused by said leak including the step of sensing a deformation in the walls of the first container; and automatically releasing said dispersant from said second container into said oil in response to said sensing so that said oil may be dispersed thereby.

12. A method for dispersing oil with an oil dispersant in the event of a leak of said oil from a first container in a ship, said method comprising the steps of:

storing said dispersant in a second container adjacent said oil, said second container being mounted inside said first container;

automatically sensing a condition caused by said leak; and automatically releasing said dispersant from said second container into said oil in response to said sensing so that said oil may be dispersed thereby; and storing a second quantity of dispersant along the outside surface of said oil tank, so that said second quantity of dispersant will mix with said oil as said oil leaks from said tank in the event of a rupture of said tank.

13. A method for dispersing oil with an oil dispersant in the event of a leak of said oil from a first container comprising an oil platform drill casing having exterior walls adjacent to a body of water, said method comprising the steps of:

storing said dispersant in a second container adjacent said oil by mounting said second container to an off-shore oil drilling platform;

automatically sensing a condition caused by said leak including measuring a pressure variation in said drill casing; and automatically releasing said dispersant from said second container into said oil in response to said sensing so that said oil may be dispersed thereby.

14. A method as in claim 13 wherein said step of sensing a condition caused by said leak includes the step of sensing the presence of oil on the surface of said body of water.

* * * * *